US009869196B2

(12) United States Patent
Day et al.

(10) Patent No.: US 9,869,196 B2
(45) Date of Patent: Jan. 16, 2018

(54) GAS TURBINE ENGINE SPRING MOUNTED MANIFOLD

(71) Applicant: General Electric Company, Schenectady, NY (US)

(72) Inventors: Christophe Jude Day, West Chester, OH (US); Christopher Francis Poranski, Cincinnati, OH (US); James Edward Thompson, Cincinnati, OH (US); Jeffrey Scott Laubenthal, West Chester, OH (US); James L. Mazuk, Cincinnati, OH (US); Vernon Leroy Smith, Evendale, OH (US)

(73) Assignee: General Electric Company, Schenectady, NY (US)

( * ) Notice: Subject to any disclaimer, the term of this patent is extended or adjusted under 35 U.S.C. 154(b) by 297 days.

(21) Appl. No.: 14/709,732

(22) Filed: May 12, 2015

(65) Prior Publication Data

US 2016/0003086 A1   Jan. 7, 2016

Related U.S. Application Data

(60) Provisional application No. 62/016,234, filed on Jun. 24, 2014.

(51) Int. Cl.
  *F01D 11/24*       (2006.01)
(52) U.S. Cl.
  CPC ........ *F01D 11/24* (2013.01); *F05D 2260/201* (2013.01); *Y02T 50/676* (2013.01)
(58) Field of Classification Search
  CPC .......... F01D 11/24; F01D 11/14; F01D 11/16; F01D 11/18; F01D 11/20; F01D 11/22; F01D 25/12; F01D 25/14
  See application file for complete search history.

(56) References Cited

U.S. PATENT DOCUMENTS 4,307,993 A * 12/1981 Hartel .................... F01D 11/08
                                                          415/116
5,104,287 A *  4/1992 Ciokajlo ................ F01D 11/22
                                                          415/126

(Continued)

FOREIGN PATENT DOCUMENTS

CA       2563221 A1    4/2007
CA       2609290 A1    5/2008
(Continued)

OTHER PUBLICATIONS

Unofficial English Translation of Chinese Office Action issued in connection with corresponding CN Application No. 201504011921 on Jun. 30, 2016.

(Continued)

*Primary Examiner* — Woody Lee, Jr.
*Assistant Examiner* — Topaz L Elliot
(74) *Attorney, Agent, or Firm* — General Electric Company; Pamela A. Kachur

(57) ABSTRACT

An arcuate panel for a thermal control assembly includes an arcuate panel base, at least one axially extending panel header sealingly attached to a radially outwardly facing surface of the panel base, a plenum therebetween, one or more spray tubes or channels depending radially inwardly from the panel base and in fluid communication with the plenum, and radially outwardly biasing spring means mounted on or attached to the radially inwardly facing surface of the panel base. The panel may include at least one set of clockwise and counter-clockwise hinge wings attached to clockwise and counter-clockwise ends of the panel base, axial positioning, and circumferential positioning. The axial positioning may include a circular row of spring clips mounted on the panel base. A hoop of arcuate panels pivotably attached by hinges may encircle a portion (Continued)

of a casing compressing leaf springs against rings of the casing.

19 Claims, 13 Drawing Sheets

(56) References Cited

U.S. PATENT DOCUMENTS

| | | | | |
|---|---|---|---|---|
| 5,540,547 A * | 7/1996 | Cole | ........................ | F01D 11/24 24/339 |
| 5,593,278 A * | 1/1997 | Jourdain | ................. | F01D 11/18 415/116 |
| 5,709,516 A * | 1/1998 | Peterson | ................. | F16F 1/324 267/162 |
| 6,896,038 B2 * | 5/2005 | Arilla | ...................... | F01D 11/24 165/47 |
| 7,114,914 B2 * | 10/2006 | Gendraud | ............... | F01D 11/24 415/108 |
| 7,309,209 B2 * | 12/2007 | Amiot | ..................... | F01D 11/24 415/136 |
| 7,503,179 B2 * | 3/2009 | Estridge | ................. | F01D 11/24 415/108 |
| 7,597,537 B2 | 10/2009 | Bucaro et al. | | |
| 7,857,585 B2 * | 12/2010 | Dhaliwal | ................ | F01D 11/24 415/213.1 |
| 8,668,438 B2 * | 3/2014 | Saroi | ....................... | F01D 11/24 415/116 |
| 2002/0053837 A1 | 5/2002 | Arilla et al. | | |
| 2003/0202876 A1 | 10/2003 | Jasklowski et al. | | |
| 2009/0053042 A1 | 2/2009 | Wilson et al. | | |
| 2010/0266393 A1 * | 10/2010 | Saroi | ....................... | F01D 11/24 415/175 |
| 2012/0027572 A1 | 2/2012 | Denece et al. | | |
| 2013/0058771 A1 | 3/2013 | Menheere et al. | | |
| 2014/0030066 A1 | 1/2014 | Schimmels et al. | | |
| 2015/0003958 A1 * | 1/2015 | Uskert | ................... | F01D 11/24 415/1 |

FOREIGN PATENT DOCUMENTS

| | | |
|---|---|---|
| CN | 101372898 A | 2/2009 |
| EP | 1609954 A1 | 12/2005 |
| EP | 1775426 A2 | 4/2007 |
| EP | 1923539 A2 | 5/2008 |
| EP | 2236750 A2 | 10/2010 |
| EP | 2420652 A2 | 2/2012 |
| WO | 96/17156 A1 | 6/1996 |

OTHER PUBLICATIONS

European Search Report and Opinion issued in connection with corresponding EP Application No. 15173425.8 dated Nov. 5, 2015.

* cited by examiner

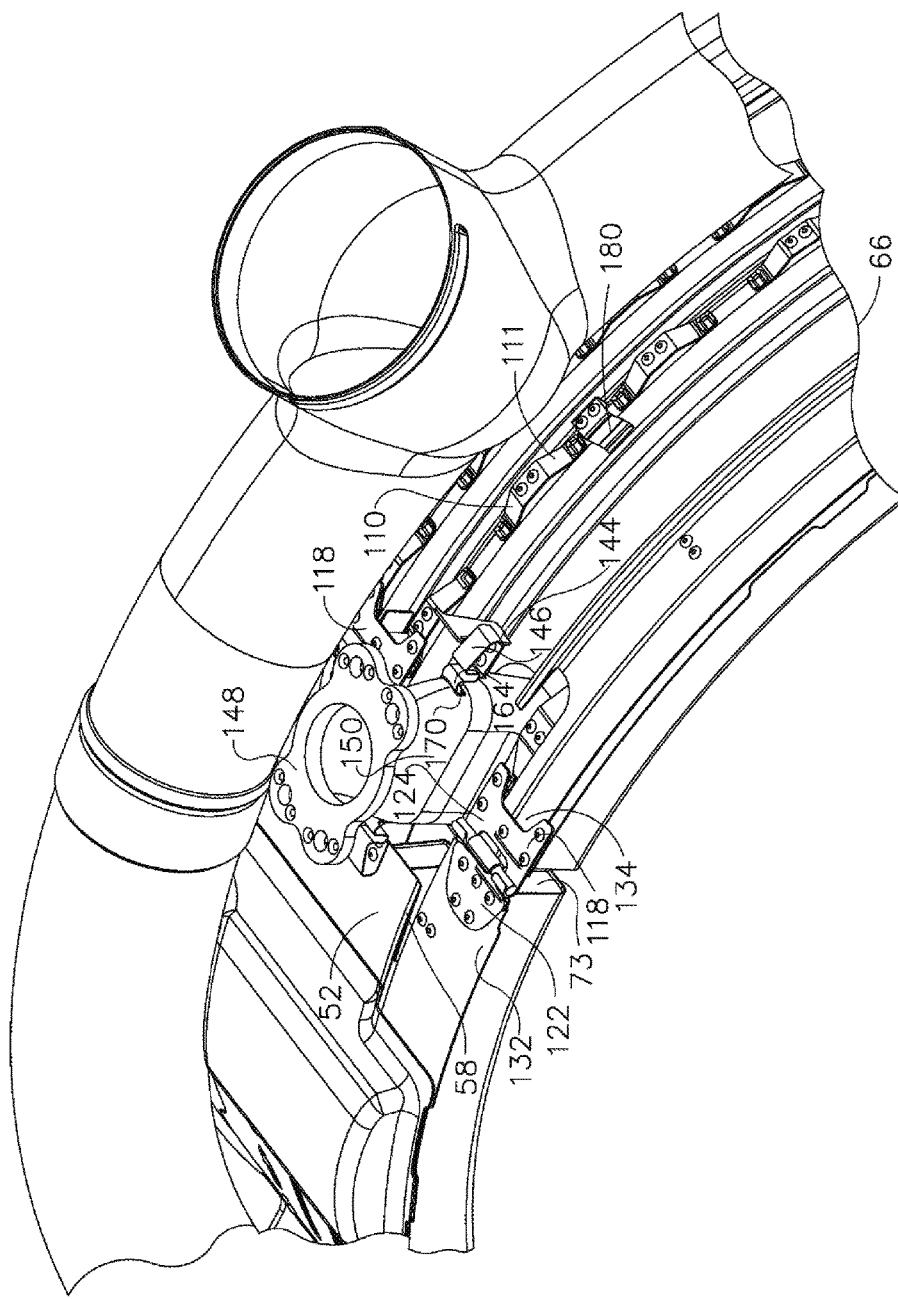

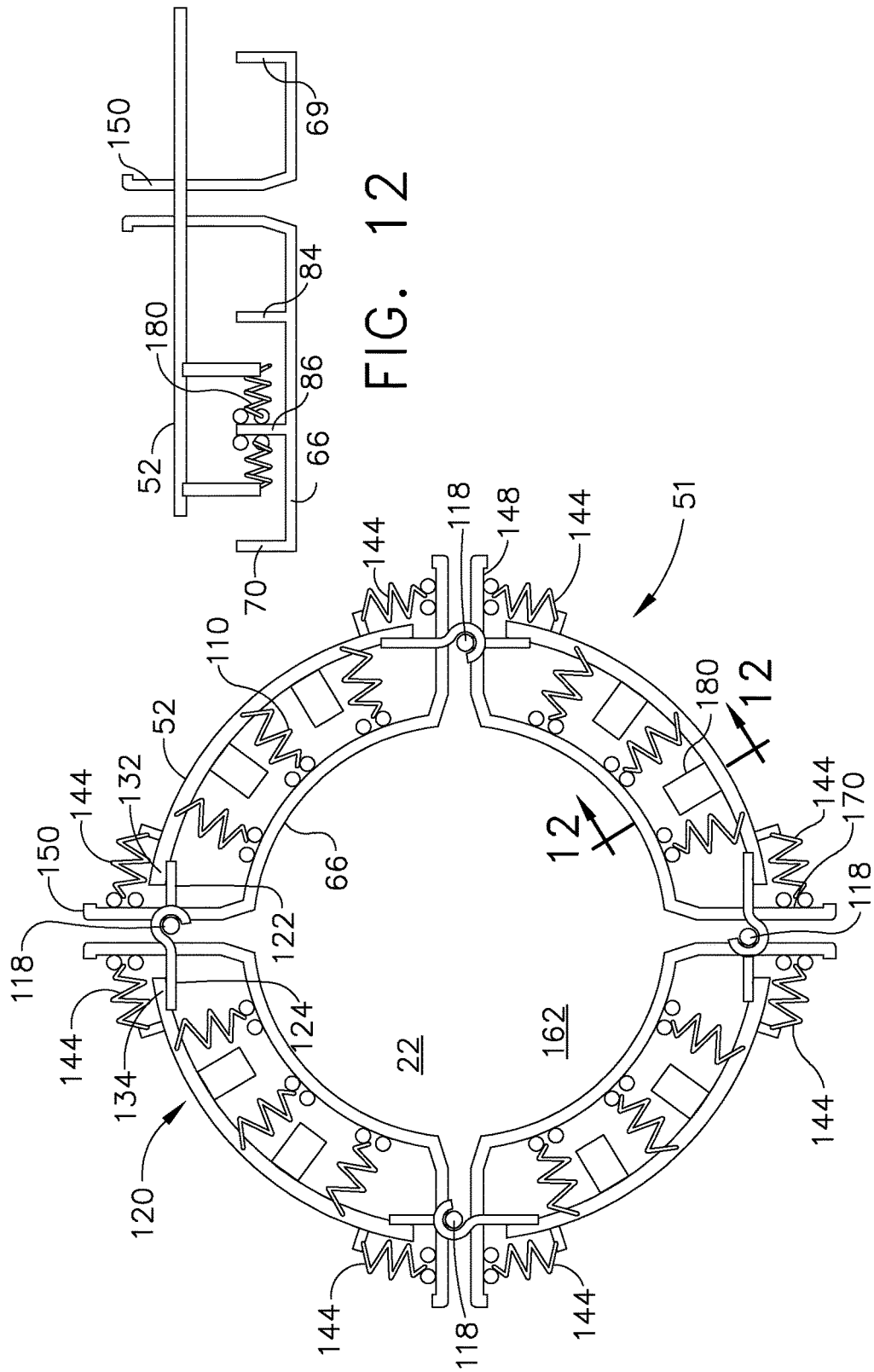

GAS TURBINE ENGINE SPRING MOUNTED MANIFOLD

CROSS-REFERENCE TO RELATED APPLICATIONS

This non-provisional application claims the benefit of priority under 35 U.S.C. §119(e) to U.S. Provisional Patent Application No. 62/016,234, entitled "GAS TURBINE ENGINE SPRING MOUNTED MANIFOLD", filed Jun. 24, 2014, which is herein incorporated in its entirety by reference.

BACKGROUND OF THE INVENTION

Field of the Invention

This invention relates to aircraft gas turbine engine active clearance control system thermal air distribution systems and, more particularly, panels and manifolds incorporating such panels to spray air on a casing of the engine.

Discussion of the Background Art

Engine performance parameters such as thrust, specific fuel consumption (SFC), and exhaust gas temperature (EGT) margin are strongly dependent upon clearances between turbine blade tips and static seals or shrouds surrounding the blade tips. Active clearance control is a well-known method to modulate a flow of cool or relatively hot air from the engine fan and/or compressor and spray it on high and low pressure turbine casings to shrink the casings relative to the high and low pressure turbine blade tips under steady state, high altitude cruise conditions. The air may be flowed to or sprayed on other static structures used to support the shrouds or seals around the blade tips such as flanges or pseudo-flanges.

One type of active clearance control system includes a thermal air distribution manifold encircling a portion of the outer casing. The manifold includes a circular array of panels and an annular supply tube is connected in fluid supply relationship to plenums of headers of the panels. Cooling air channels of the panel are attached to and in fluid connection with the header. The panels encircle the casing and the channels form continuous spray tubes or rings for spraying cooling air on casing. Examples of manifolds are disclosed in U.S. Pat. No. 7,597,537 to Bucaro, et al., issued Oct. 6, 2009, entitled "Thermal control of gas turbine engine rings for active clearance control" and United States Patent Application No. 20140030066 to Schimmels et al., published Jan. 30, 2014, entitled "ACTIVE CLEARANCE CONTROL MANIFOLD SYSTEM". U.S. Pat. No. 7,597,537 and United States Patent Application No. 20140030066 are assigned to the General Electric Company, the same assignee as the assignee of this patent and are hereby incorporated herein by reference.

The manifolds are typically mounted to the turbine casing using panel brackets rigidly mounted to casing brackets which, in turn, are rigidly mounted to the turbine casing. This arrangement results in many parts, added weight, and adds to the cost of engine maintenance. Furthermore, the manifold is subject to vibratory stresses causing high cycle fatigue and thermally induced low cycle fatigue which subjects the casing and the manifold assembly to reduced part damage tolerance.

SUMMARY

An arcuate panel includes an arcuate panel base, at least one axially extending panel header sealingly attached to a radially outwardly facing surface of the panel base, a plenum between the panel header and the panel base, one or more spray tubes or channels depending radially inwardly from and mounted on or attached to a radially inwardly facing surface of the panel base, the spray tubes or channels in fluid communication with the plenum, and radially outwardly biasing spring means mounted on or attached to the radially inwardly facing surface of the panel base.

The radially outwardly biasing spring means may include radially bent leaf springs. The arcuate panel may include at least one set of clockwise and counter-clockwise hinge wings attached to clockwise and counter-clockwise ends respectfully of the arcuate panel base.

The arcuate panel may include axial positioning means for positioning the panel axially and aiming spray holes of the spray tubes or channels and circumferential positioning means for positioning the panel circumferentially. The axial positioning means may include a circular row of spring clamps or clips mounted on or attached to the radially inwardly facing surface of the panel base. Each of the spring clamps or clips may include longitudinally or axially spaced apart spring fingers depending radially inwardly from a spring base attached to the radially inwardly facing surface of the panel base.

The arcuate panel may include circularly elongated feed apertures or slots disposed through the panel base within the panel headers for flowing control air from the plenums to the spray tubes or channels, the spray tubes or channels closed and sealed at their circumferential ends, and circularly elongated exhaust apertures or slots disposed through the panel base outside of the panel headers.

A thermal control assembly includes a spring mounted thermal air distribution manifold encircling a portion of an outer casing and the manifold includes an annular row or hoop of arcuate panels. Each of the arcuate panels includes an arcuate panel base and at least one axially extending panel header sealingly attached to a radially outwardly facing surface of the panel base, a plenum between the panel header and the panel base, one or more spray tubes or channels depending radially inwardly from and mounted on or attached to a radially inwardly facing surface of the panel base, the spray tubes or channels in fluid communication with the plenum, and radially outwardly biasing spring means mounted on or attached to the radially inwardly facing surface of the panel base and contacting the outer casing.

The thermal control assembly may further include connecting hinges pivotably attaching adjacent ones of the arcuate panels in the hoop, each of the connecting hinges including clockwise and counter-clockwise hinge wings pivotably connected together, and the clockwise and counter-clockwise hinge wings being attached to clockwise and counter-clockwise ends respectfully of adjacent ones of the arcuate panel bases.

The thermal control assembly may further include one or more thermal control rings attached to or integral with the outer casing and one or more of the spray tubes or channels axially spaced apart from and partially radially coextensive with the one or more thermal control rings, and axial positioning means for positioning the panel axially and aiming spray holes of the spray tubes or channels and circumferential positioning means for positioning the panel circumferentially.

The axial positioning means may include a circular row of spring clamps or clips mounted or attached to the radially inwardly facing surface of the panel base and clamped or clipped on a single one of the one or more thermal control rings. Each of the spring clamps or clips may include longitudinally or axially spaced apart spring fingers depending radially inwardly from a spring base attached to the radially inwardly facing surface of the panel base, the axially spaced apart spring fingers engaging the single one of the one or more thermal control rings, and a chamfer at a radially outer end of the single one of the one or more thermal control rings.

Radially extending members of the radially outer casing may be circumferentially located between each pair of adjacent ones of the arcuate panels, the circumferential positioning means may include a pair of axial leaf springs on an adjacent pair of the arcuate panels respectively extending generally circumferentially and engaging one of the radially extending members, and the axial leaf springs including free ends engaging and snapped into grooves or detentes in the radially extending members. The one or more thermal control rings may include forward and aft thermal control rings, the radially bent leaf springs including axially spaced apart circular forward and aft rows of the radially bent leaf springs attached to the radially inwardly facing surfaces of each of the panel bases, and the forward and aft rows of the radially bent leaf springs engaged and compressed against radially outer ring surfaces of the forward and aft thermal control rings.

The thermal control assembly may further include one or more connecting hinges pivotably attaching all but a last pair of adjacent ones of the arcuate panels in the hoop, one or more locking hinges pivotably attaching the last pair of adjacent ones of the arcuate panels, and a removable hinge pin disposed through hollow clockwise and counter-clockwise hollow knuckles of adjacent clockwise and counter-clockwise hinge wings respectively of the one or more locking hinges.

Each of the connecting hinges may include a hinge pin disposed through clockwise and counter-clockwise knuckles of the clockwise and counter-clockwise hinge wings respectively. The hinge pin being integral with the central clockwise knuckle and rotatably disposed through the counter-clockwise knuckle, and the central clockwise knuckle including J hooks looped around the hinge pin.

The thermal control assembly may further include the outer casing including axially spaced apart forward and aft casing flanges, the radially bent leaf springs including a third row of the radially bent leaf springs attached to the radially inwardly facing surfaces of each of the panel bases, the third row of the radially bent leaf springs engaged and compressed against a third radially outer ring surface of the aft casing flange, and the third row axially spaced apart from the forward and aft rows of the radially bent leaf springs.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

FIG. 10 is a partially cut-away perspective view illustration of spring connectors used to position and mount the panel around the casing illustrated in FIG. 5.

FIG. 11 is a schematic view illustration of spring connectors used to position and mount the panel radially and circumferentially around the casing illustrated in FIG. 5.

FIG. 12 is a schematic view illustration of spring connectors used to position and mount the panel axially with respect to the casing illustrated in FIG. 5.

DETAILED DESCRIPTION

Figure 1:
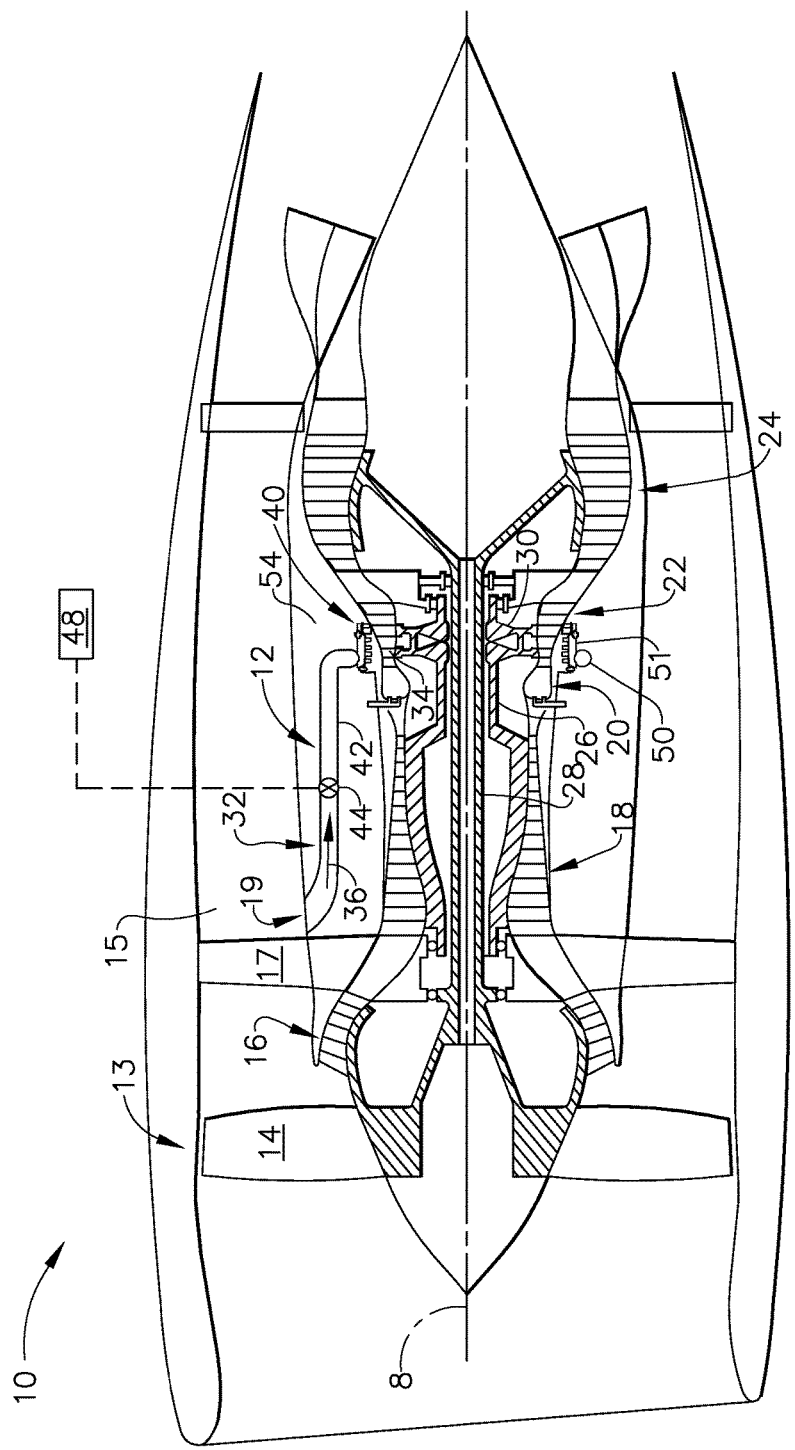
FIG. 1 is a schematic cross-section view illustration of an aircraft gas turbine engine including an exemplary active clearance control system with a spring mounted air distribution manifold.

Schematically illustrated in cross-section in FIG. 1 is an exemplary embodiment of an aircraft gas turbine engine 10 including a thermal control apparatus illustrated herein as an active clearance control system 12. The engine 10 has, in downstream serial flow relationship, a fan section 13 including a fan 14, a booster or low pressure compressor (LPC) 16, a high pressure compressor (HPC) 18, a combustion section 20, a high pressure turbine (HPT) 22, and a low pressure turbine (LPT) 24. A high pressure shaft 26 disposed about an engine axis 8 drivingly connects the HPT 22 to the HPC 18 and a low pressure shaft 28 drivingly connects the LPT 24 to the LPC 16 and the fan 14. The HPT 22 includes an HPT rotor 30 having turbine blades 34 mounted at a periphery of the rotor 30.

Figure 2:
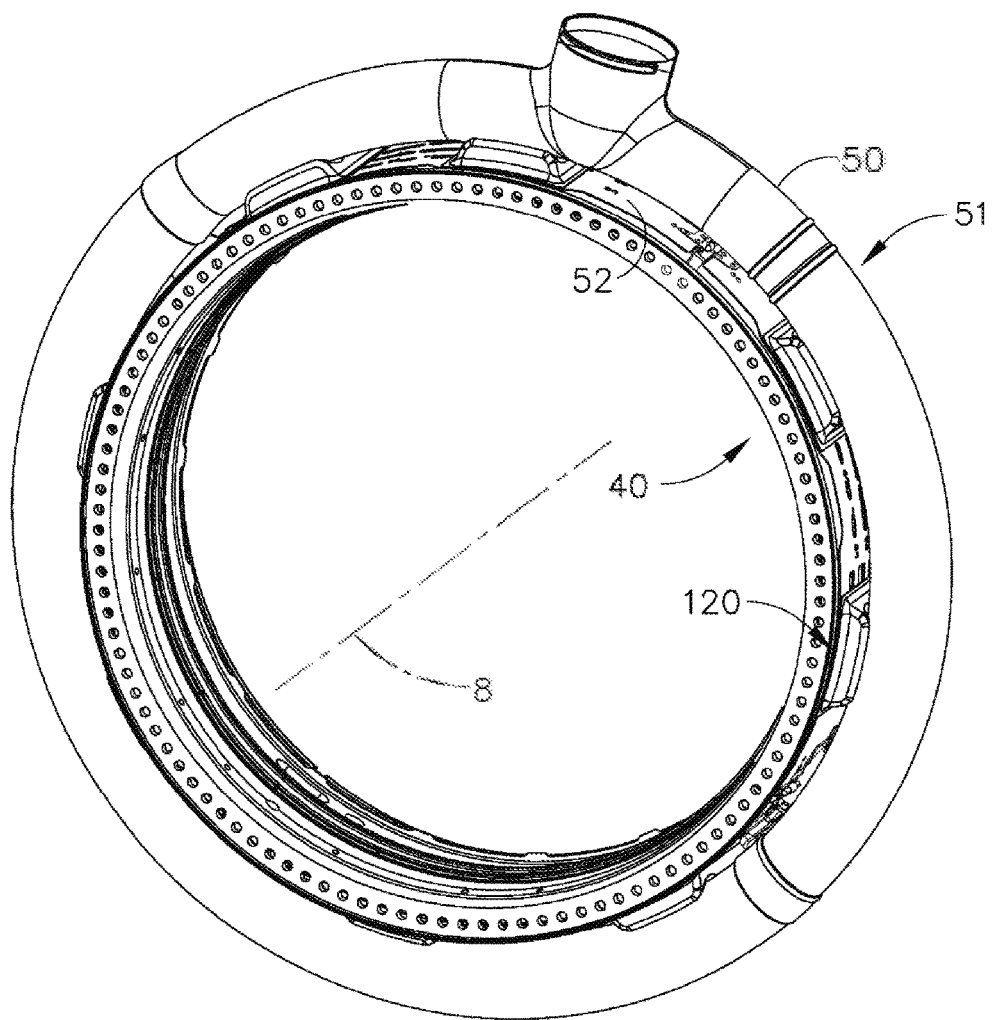
FIG. 2 is a perspective view illustration of the spring mounted air distribution manifold circumscribed about an engine casing of the aircraft gas turbine engine illustrated in FIG. 1.
Figure 3:
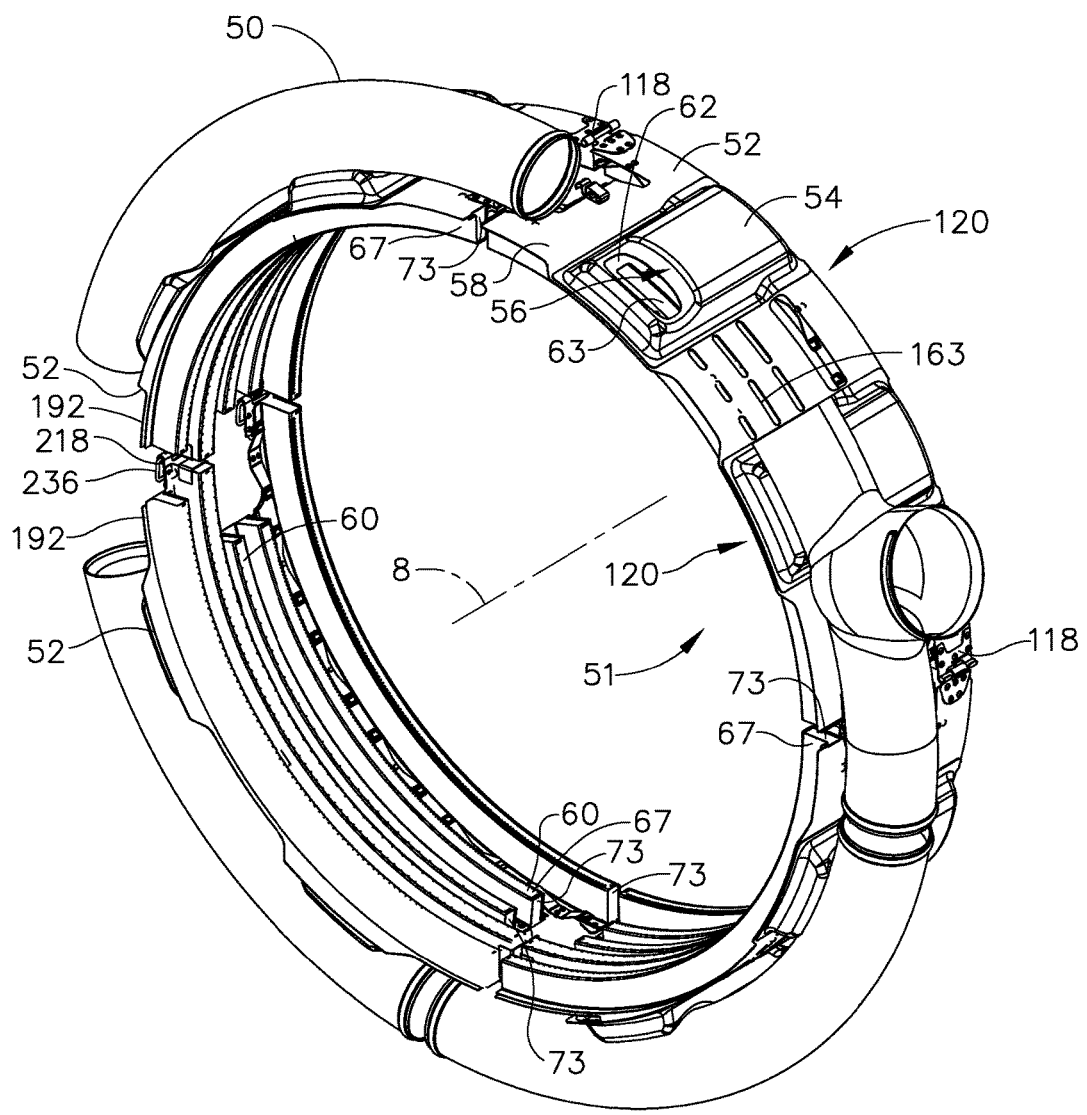
FIG. 3 is a partially cut-away perspective view illustration of the spring mounted air distribution manifold illustrated in FIG. 2.

Referring to FIGS. 1-3, a compressed fan air supply 32 is used as a source for thermal control air 36 supplied to a turbine blade tip clearance control apparatus generally shown at 40 through an axially extending air supply tube 42. An air valve 44 disposed in the air supply tube 42 controls the amount of thermal control air flowed therethrough. The thermal control air 36 serves as cooling air in the exemplary embodiment of the active clearance control system 12 illustrated herein. The cooling air is controllably flowed from a fan bypass duct 15 surrounding the booster or low pressure compressor (LPC) 16 through the axial air supply tube 42 to a spring mounted air distribution manifold 51 of the turbine blade clearance control apparatus 40.

The spring mounted air distribution manifold 51 includes an annular header 50 illustrated herein as annular tube circumscribed about the engine axis 8. The air valve 44 and the amount of thermal control air 36 impinged for controlling turbine blade tip clearances CL, illustrated in FIG. 4, is controlled by a controller 48 which may be a digital electronic engine control system such as a Full Authority Digital Electronic Control (FADEC). The FADEC may also control temperature of the thermal control air 36, if so desired. An air supply inlet 19 to the axial air supply tube 42 is located downstream of exit guide vanes 17 disposed in the fan bypass duct 15 downstream of the fan 14. The annular header 50 is circumferentially positioned around a radially outer casing 66 of the high pressure turbine 22.

Figure 4A:
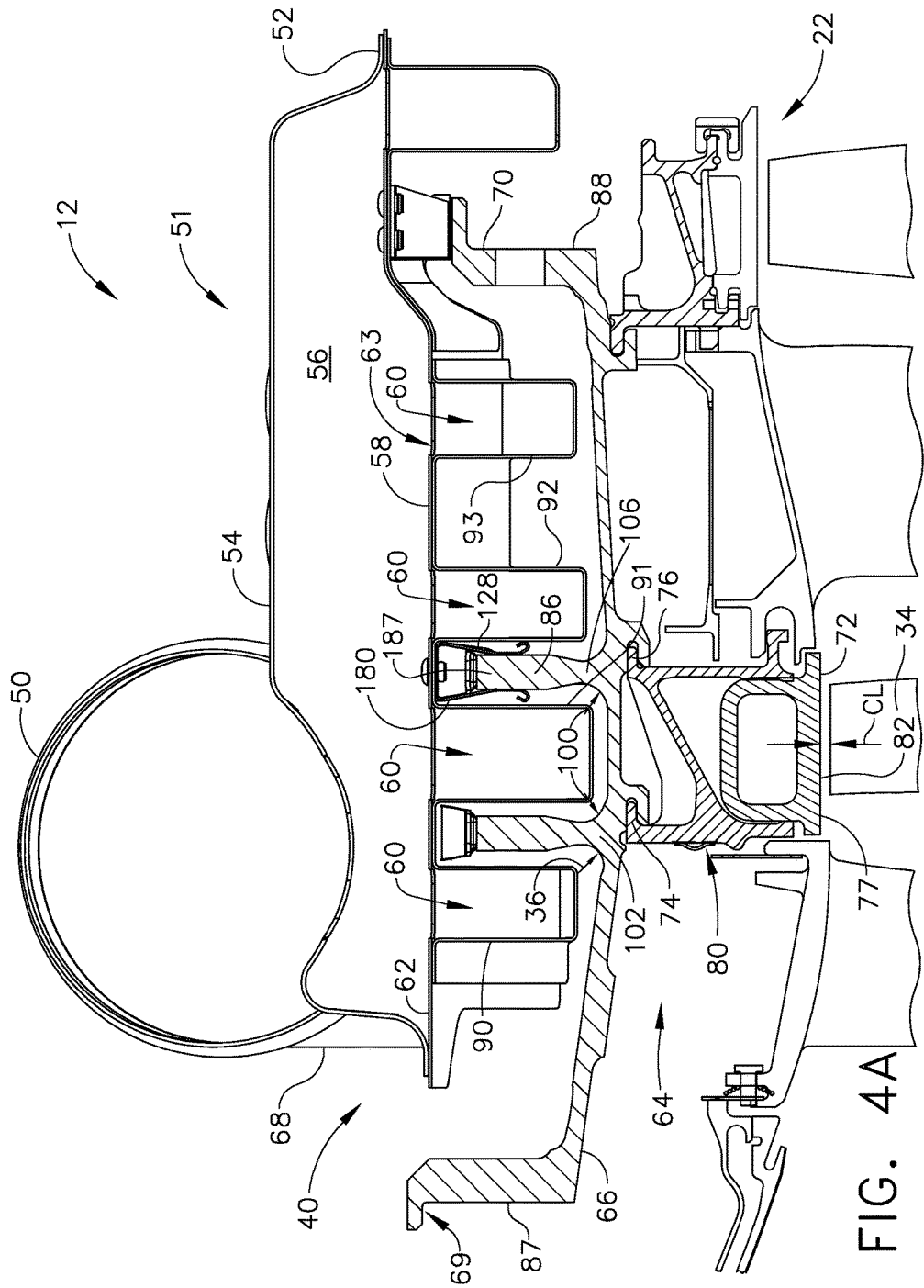
FIG. 4A is a sectional view illustration taken circumferentially of the spring mounted air distribution manifold and the engine illustrated in FIG. 1.

Referring to FIGS. 3 and 4A, the turbine blade tip clearance control apparatus generally shown at 40 includes an annular row or hoop of arcuate panels 52 of the spring mounted air distribution manifold 51. The arcuate panels 52 are circumferentially positioned around a radially outer casing 66 of the high pressure turbine 22. Each arcuate panel 52 includes an arcuate panel base 58 which is generally in the shape of a cylindrical annular wall segment. One or more axially extending supply panel headers 54 are brazed or otherwise bonded or sealingly attached to a radially outwardly facing surface 62 of the panel base 58 forming plenums 56 between the panel headers 54 and the panel base 58. The supply panel headers 54 are generally box-shaped.

Each of the panel headers 54 is connected to the annular header 50 of the distribution manifold 51 by a T fitting 68. Circularly elongated feed apertures or slots 63 are disposed through the panel base 58 within the panel headers 54, as illustrated in FIG. 3, allowing the cooling or control air 36 to flow from the plenums 56 to a plurality of spray tubes or channels 60 as illustrated in FIGS. 3-8. The spray tubes 60 depend radially inwardly from and are mounted on radially inwardly facing surfaces 182 of the panel bases 58 of the arcuate panels 52. The spray tubes 60 are arcuate segments attached to the panel base 58 and are closed and sealed at their circumferential ends 67 with caps 73 as illustrated in FIGS. 3, 5, and 7. Circularly elongated exhaust apertures or slots 163 are disposed through the panel base 58 between or outside of the panel headers 54 allowing the cooling or control air 36 to exhaust or flow out of the from between the spray tubes or channels 60 and the radially outer casing 66 of the high pressure turbine 22 after the control air has cooled the casing.

As schematically illustrated in FIG. 11, the exemplary embodiment of the spring mounted air distribution manifold 51 includes 4 panels 52. A controlling factor in the number of panels 52 is the number of cooling air horns or bosses 150 on the outer casing 66 of the high pressure turbine 22.

Figure 4B:
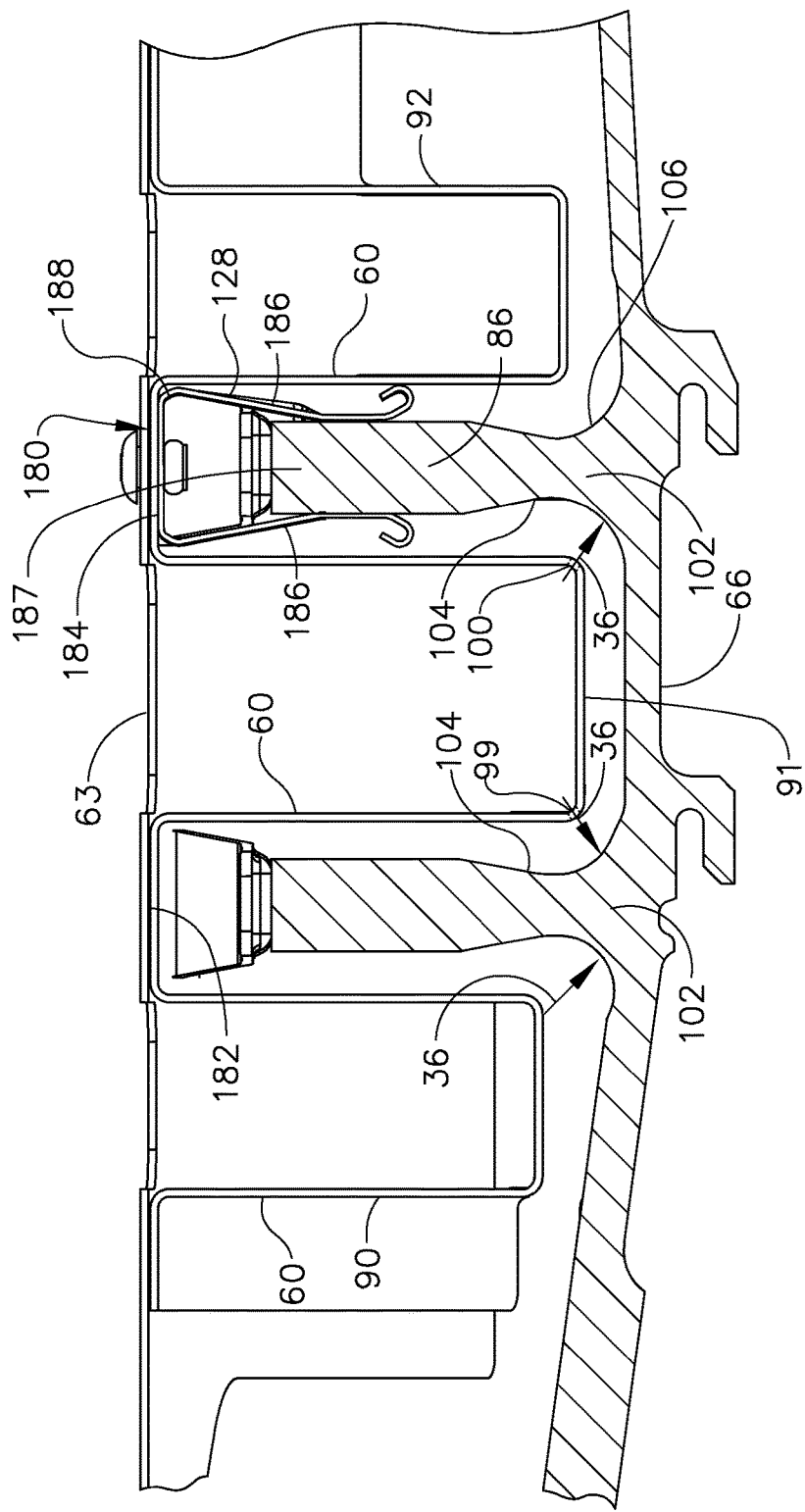
FIG. 4B is an enlarged sectional view illustration of spring clamps or clips illustrated in FIG. 4A.
Figure 5:
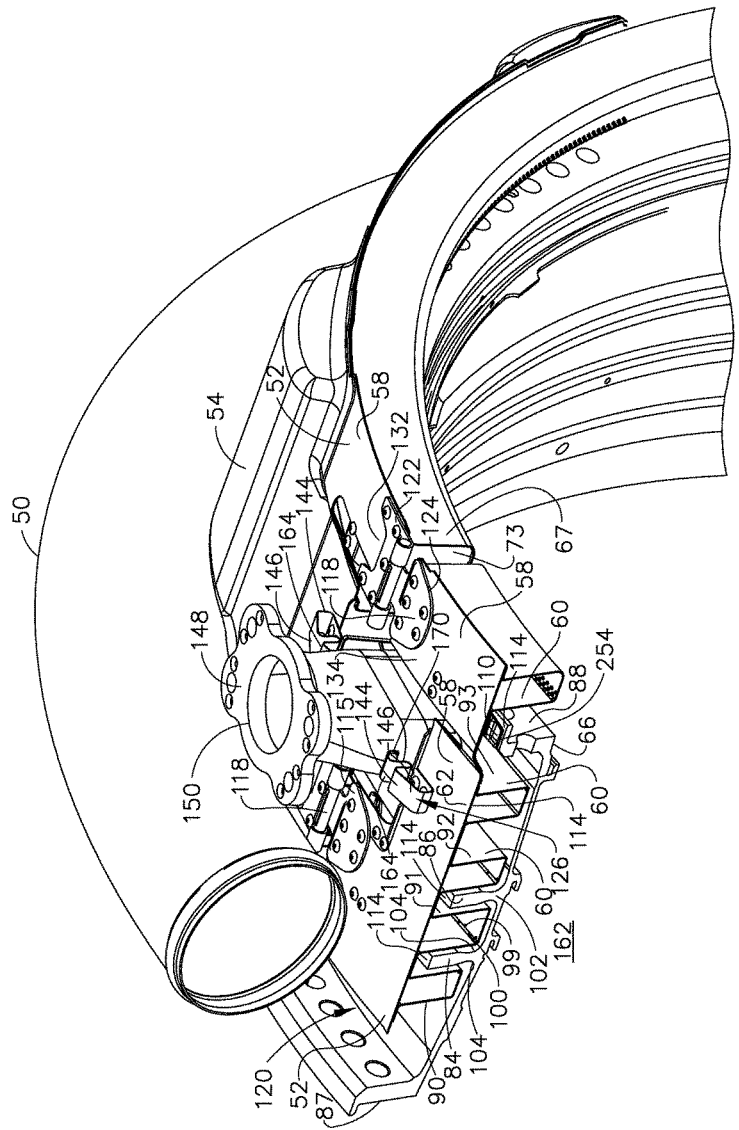
FIG. 5 is a partially cut-away perspective view illustration of a portion of the spring mounted air distribution manifold and the engine casing illustrated in FIG. 3.

Illustrated in FIGS. 4A and 4B is a portion of a first turbine stator assembly 64 attached to a radially outer casing 66 of the HPT 22 by forward and aft case hooks 69, 70. The stator assembly 64 includes an annular segmented stator shroud 72 having shroud segments 77 mounted by forward and aft shroud hooks 74, 76 to an annular segmented shroud support 80 of the first turbine stator assembly 64. The shroud 72 circumscribes turbine blades 34 of the rotor 30 and helps reduce the flow from leaking around a radial outer blade tip 82 of the blade 34. The active clearance control system 12 is used to minimize a radial blade tip clearance CL between the outer blade tip 82 and the shroud 72, particularly during cruise operation of the engine 10.

It is well known in the industry that small turbine blade tip clearances CL provide lower operational specific fuel consumption (SFC) and, thus, large fuel savings. Forward and aft thermal control rings 84, 86 (as illustrated in FIGS. 4-5) are provided to more effectively control blade tip clearance CL with a minimal amount of time lag and thermal control (cooling or heating depending on operating conditions) air flow. The forward and aft thermal control rings 84, 86 are attached to or otherwise associated with the outer casing 66 and may be integral with the respective casing (as illustrated in FIGS. 4-5), bolted to or otherwise fastened to the casing or mechanically isolated from, but in sealing engagement with, the casing.

Referring to FIGS. 4A, 4B, and 5, the forward and aft thermal control rings 84, 86 illustrated herein are also referred to as pseudo flanges. The radially outer casing 66 of the high pressure turbine 22 incudes axially spaced apart forward and aft casing flanges 87, 88 used to bolt the high pressure turbine (HPT) 22 to the combustion section 20 and the low pressure turbine (LPT) 24 may also be used as thermal control rings or otherwise be sprayed with thermal control air 36. The thermal control rings provide thermal control mass to more effectively move the shroud segments 77 radially inwardly (and outwardly if so designed) to adjust the blade tip clearances CL. The forward and aft case hooks 69, 70 are located generally radially inwardly of and axially near or at the forward and aft thermal control rings 84, 86 to improve response to changes in thermal air impinging the control rings.

The plurality of spray tubes or channels 60 are illustrated herein as including first, second, third, and fourth spray tubes or channels 90-93 with spray holes 100 oriented to impinge thermal control air 36 (cooling air) onto bases 102 of the forward and aft thermal control rings 84, 86 to cause the shroud segments 77 to move radially inwardly to tighten up or minimize the blade tip clearances CL. The bases 102 are portions of the fillets 104 between the outer casing 66 and centers 106 of the fillets 104. The plurality of spray tubes or channels 60 are axially spaced apart from and partially radially coextensive with the thermal control rings to facilitate and enhance impingement cooling by thermal control air 36 (cooling air) injected through the spray holes 100.

More particularly, the spray holes 100 are oriented to impinge thermal control air 36 (cooling air) into the centers 106 of the fillets 104 of the forward and aft thermal control rings 84, 86 to cause the shroud segments 77 to move radially inwardly to tighten up or minimize the blade tip clearances CL. The first spray tube 90 is axially located forward of the forward thermal control ring 84. The second spray tube 91 is axially located between the forward and aft thermal control rings 84, 86 and has two circular rows 99 of the spray holes 100 oriented to impinge thermal control air 36 into the centers 106 of the fillets 104. The third spray tube 92 is axially located aft of the aft thermal control ring 86.

Figure 6:
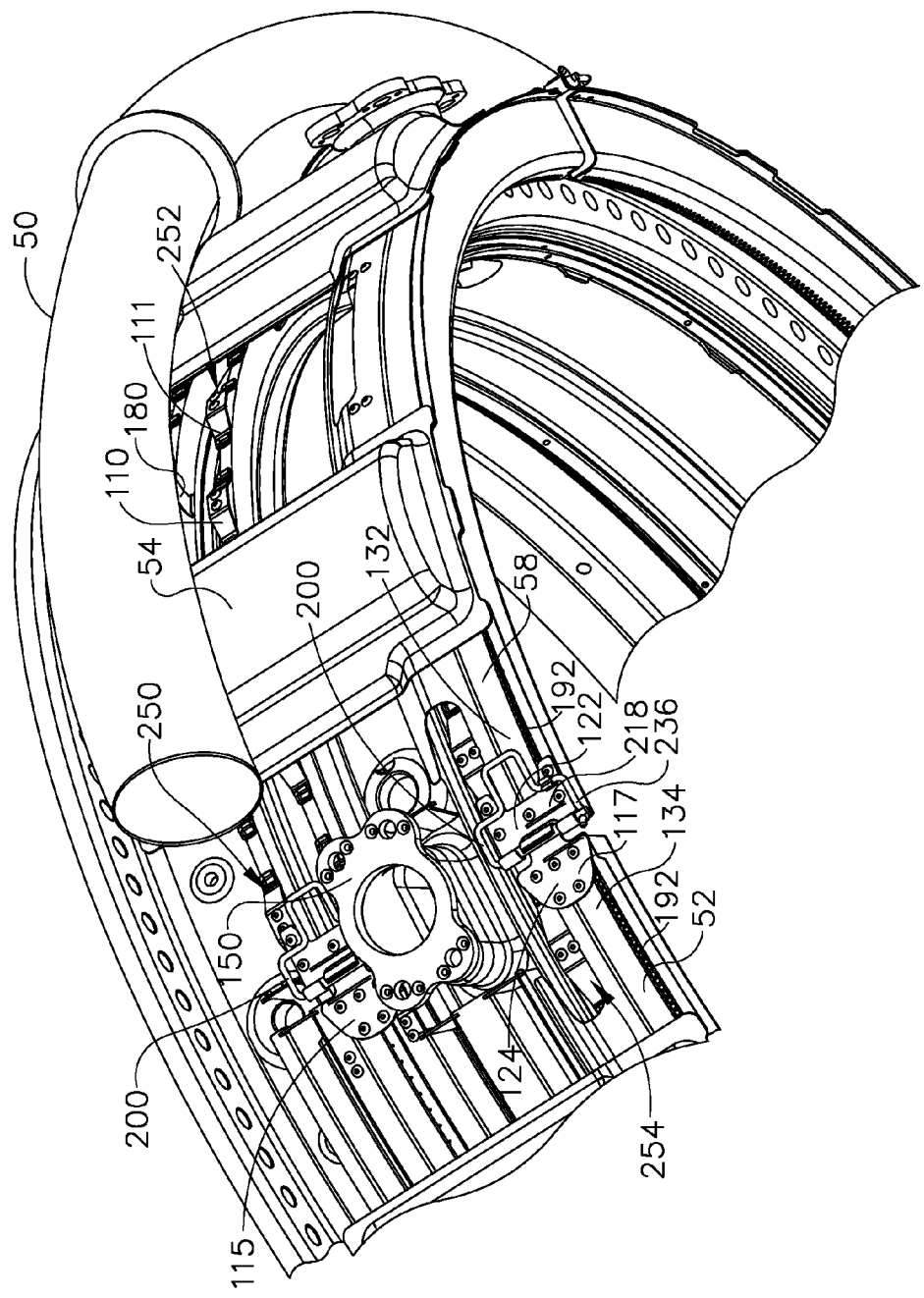
FIG. 6 is a perspective view illustration a portion of a panel of and leaf springs supporting the panel of the spring mounted air distribution manifold illustrated in FIG. 3.
Figure 7:
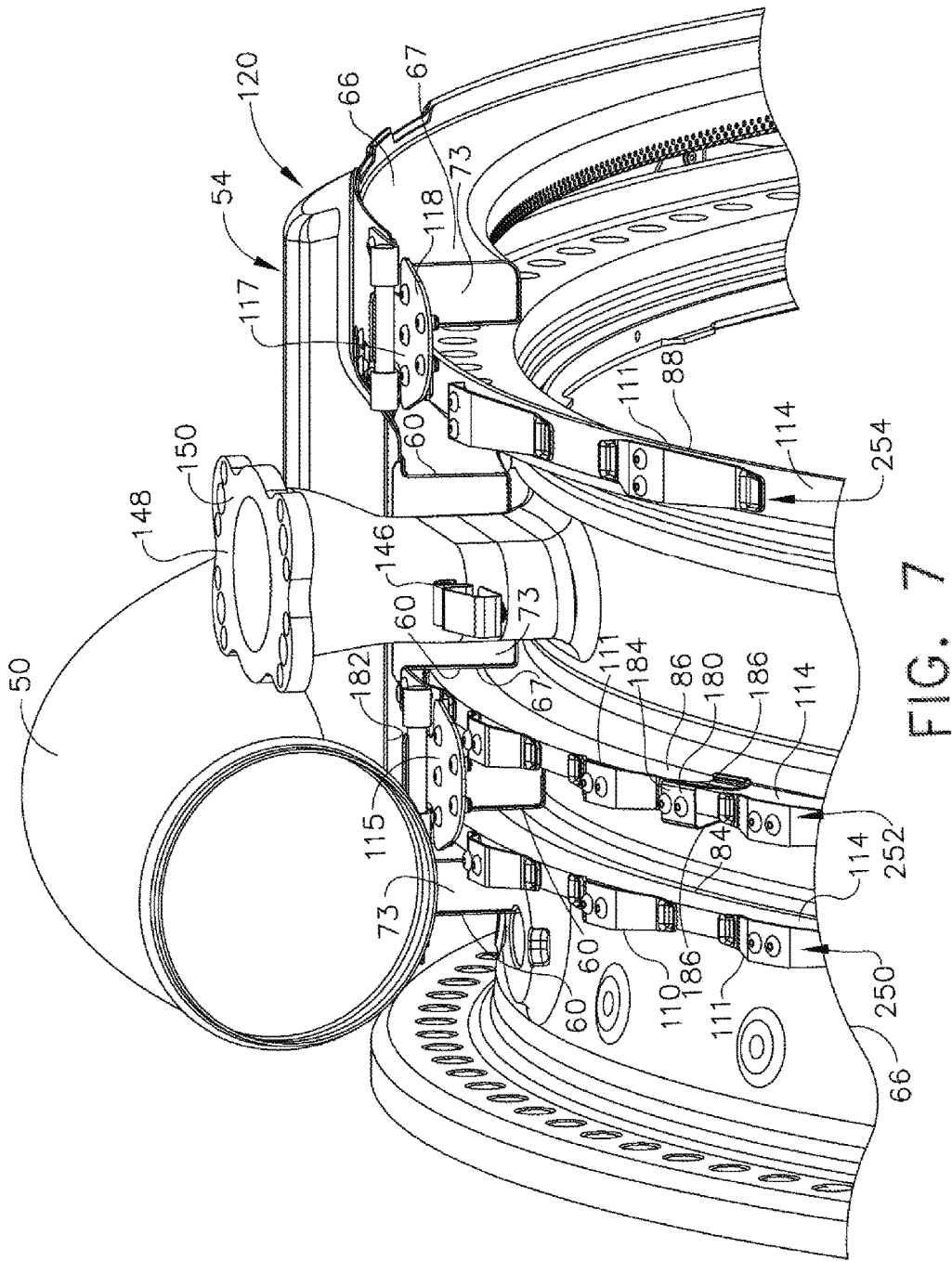
FIG. 7 is a partially cut-away perspective view illustration of a portion of a panel spring mounted on the engine casing and a cooling air supply boss extending radially away from the casing illustrated in FIG. 5.
Figure 8:
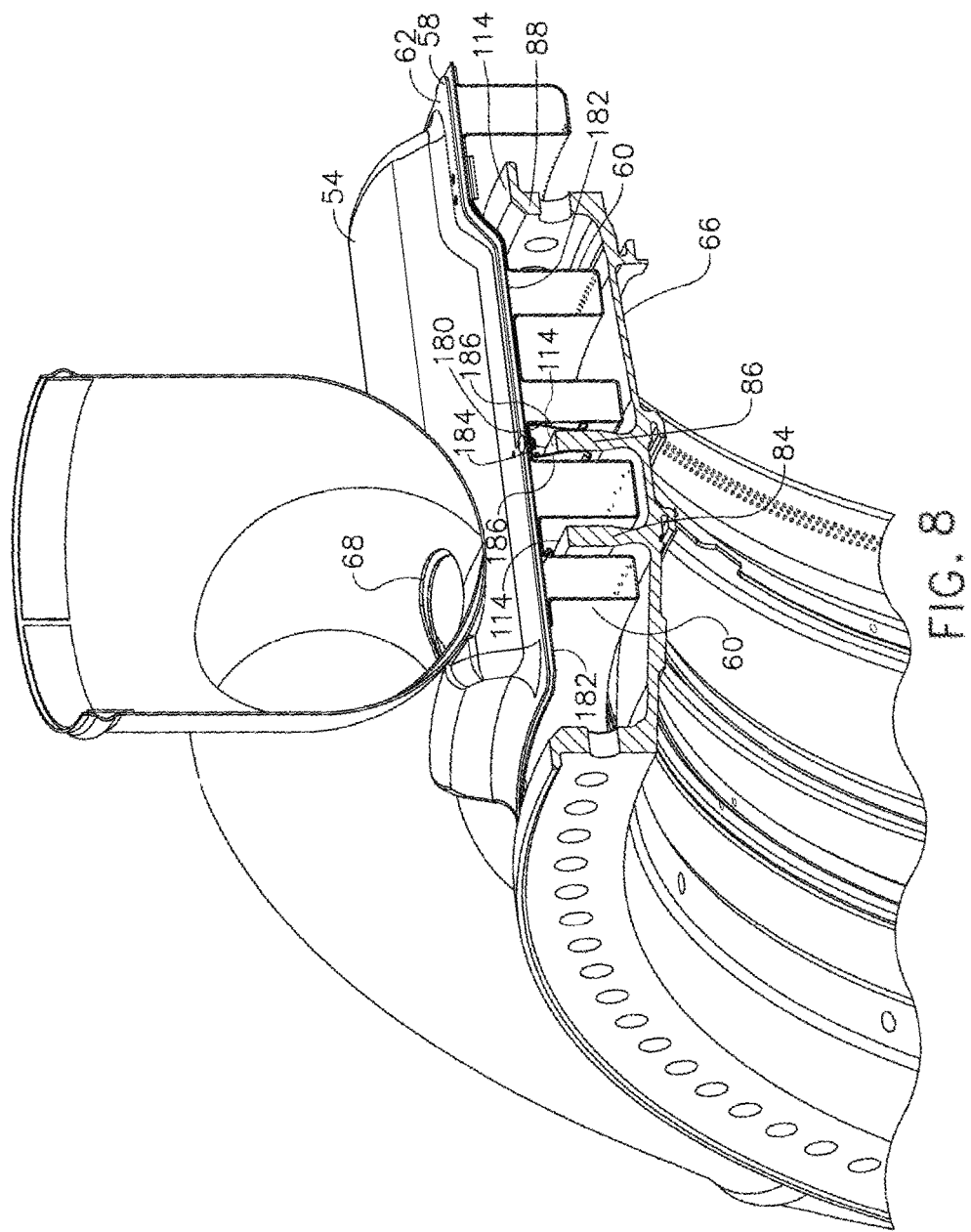
FIG. 8 is a partially cut-away perspective view illustration a portion of the panel, header, and channels of the panel mounted on the engine casing illustrated in FIG. 5.
Figure 9:
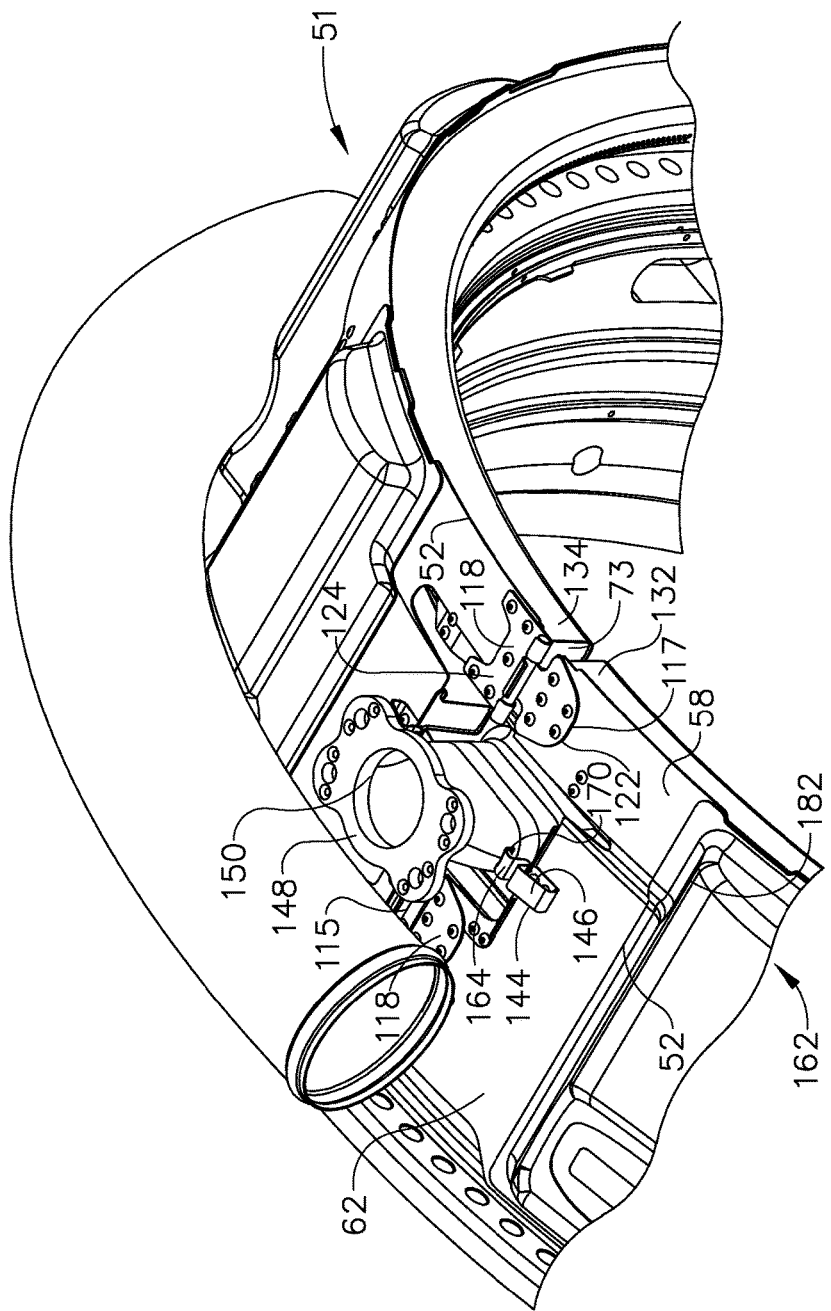
FIG. 9 is a perspective view illustration of a circular connector holding together adjacent panels and circular locators for circumferentially locating the panels around the casing with respect to a boss of the casing illustrated in FIG. 5.

Referring to FIGS. 5-7, the arcuate panels 52 are spring mounted in place to position the plurality of spray tubes or channels 60 so that the spray holes 100 are oriented to impinge the thermal control air 36 (cooling air) on a desired position on the outer casing 66 of the HPT 22. The desired positions illustrated herein are the bases 102 of the forward and aft thermal control rings 84, 86. Each arcuate panel 52 includes an arcuate panel base 58 which is generally in the shape of a cylindrical annular wall segment. The arcuate panels 52 are spring mounted by radially outwardly biasing spring means 110. The radially outwardly biasing spring means 110 are disposed between and in contact with the arcuate panel bases 58 of the arcuate panels 52 and the outer casing 66 of the HPT 22. The exemplary embodiment of the spring mounted air distribution manifold 51 illustrated herein provides radially inwardly bent leaf springs 111 for the radially outwardly biasing spring means 110 which are mounted on radially inwardly facing surfaces 182 of the panel bases 58 of the arcuate panels 52 and contact the forward and aft thermal control rings 84, 86 and the aft casing flange 88. The radially bent leaf springs 111 are so referenced herein because they provide radially outwardly biasing. Three axially spaced apart circular rows of the radially bent leaf springs 111 are denoted herein as forward, aft, and third rows 250, 252, 254 and are attached to the radially inwardly facing surfaces 182 of the panel bases 58. The radially bent leaf springs 111 in the forward, aft, and third rows 250, 252, 254 engage and compress against radially outer ring surfaces 114 of the forward and aft thermal control rings 84, 86 and the aft casing flange 88 respectively. The radially bent leaf springs 111 may also engage and compress against other surfaces of the outer casing 66.

Referring to FIGS. 3, 5, 6, 9, and 11, the arcuate panels 52 are radially pivotably attached to each other around the outer casing 66 which allows the arcuate panels 52 to pivot radially inwardly and outwardly to a limited degree with respect to the engine axis 8. The exemplary embodiment of the spring mounted air distribution manifold 51 illustrated herein incorporates connecting hinges 118, further illustrated in FIG. 13, to pivotably attach adjacent arcuate panels 52 to form a hoop 120 of the arcuate panels 52. Two connecting hinges 118, forward and aft hinges 115, 117, are used to connect or attach each adjacent pair arcuate panels 52 as illustrated in FIGS. 5-7 and 9.

Figure 13:
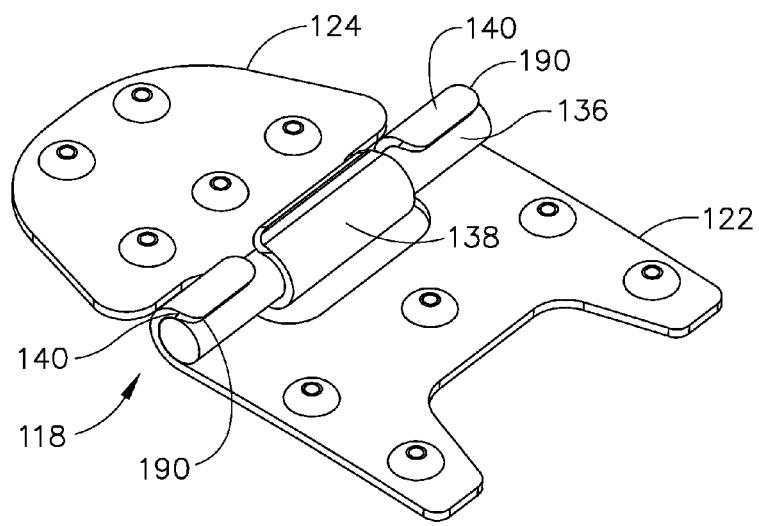
FIG. 13 is an enlarged perspective view illustration of a connecting hinge used to connect adjacent panels in the spring mounted air distribution manifold illustrated in FIG. 5.

Referring to FIGS. 5-7, 9 and 13, each connecting hinge 118 includes clockwise and counter-clockwise hinge wings 122, 124 attached to clockwise and counter-clockwise ends 132, 134 respectfully of the arcuate panels 52 of the adjacent arcuate panels 52. Referring more specifically to FIG. 13, the clockwise and counter-clockwise hinge wings 122, 124 are pivotably connected to each other by a hinge pin 136 disposed through clockwise and counter-clockwise knuckles 138, 140 of the clockwise and counter-clockwise hinge wings 122, 124 respectively. The exemplary embodiment of the connecting hinges 118 illustrated herein includes the hinge pin 136 integral a single central clockwise knuckle 138. Two spaced apart counter-clockwise knuckles 140 located on opposite sides of and interdigitated with the central clockwise knuckle 138 include J hooks 190 looped around the hinge pin 136. During assembly, the arcuate panels 52 are positioned around the outer casing 66 of the high pressure turbine 22 and are attached to each other by looping the J hooks 190 looped around the hinge pin 136.

Figure 14:
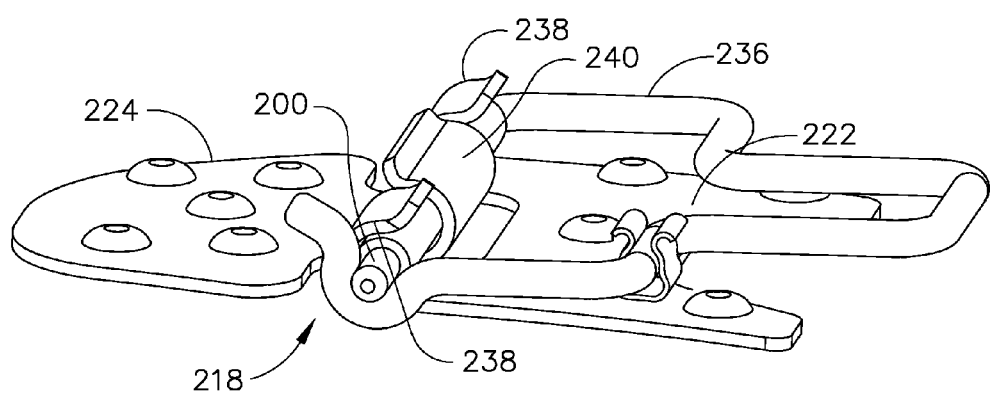
FIG. 14 is an enlarged perspective view illustration of a locking hinge with a D spring pin used to connect only one pair of adjacent panels in the spring mounted air distribution manifold illustrated in FIG. 6.

Referring to FIGS. 3, 6, and 14 during assembly, the last pair 192 of the arcuate panels 52, illustrated in FIG. 6, are connected or attached to each other by inserting a removable hinge pin 236 through hollow clockwise and counter-clockwise hollow knuckles 238, 240 of adjacent clockwise and counter-clockwise hinge wings 222, 224 respectively of locking hinges 218. This may require some extra force to bring their respective clockwise and counter-clockwise knuckles 238, 240 close enough to slip a removable hinge pin 200 through the hollow knuckles to form the hoop 120 of the arcuate panels 52. This also compresses the radially bent leaf springs 111 between the forward and aft thermal control rings 84, 86 and the aft casing flange 88 and the arcuate panels 52 which stiffens up the hoop 120 and provides the hoop 120 with resistance to panel flattening due to radial gradient between inner and outer panel surfaces. The hoop 120 structure provides improved and tunable damping coefficient for improved high cycle fatigue (HCF) capability. The spring mounting also reduces thermally induced low cycle fatigue (LCF).

The outwardly biasing spring means 110 or the radially bent leaf springs 111 provide radial positioning of the panels 52 and the hoop 120. Circumferential positioning means 126, generally illustrated in FIG. 5, and axial positioning means 128, generally illustrated in FIGS. 4A and 4B, may also be provided for the panels 52 and the hoop 120.

Referring to FIGS. 5 and 9-11, the exemplary embodiment of the circumferential positioning means 126 of the spring mounted air distribution manifold 51 illustrated herein provides circumferential positioning of the panels 52 and the hoop 120 using circumferentially extending axial leaf springs 144. Two circumferentially spaced apart circumferentially extending axial leaf springs 144 per panel 52 are mounted to the radially outwardly facing surfaces 62 of the panel bases 58 of the arcuate panels 52. The exemplary embodiment of the axial leaf spring 144 illustrated herein has a single leaf spring member 146 extending generally circumferentially to engage a nearby radially extending member 148 of the radially outer casing 66 of the high pressure turbine 22. Each radially extending member 148 is circumferentially located between each pair of adjacent ones of the panel bases 58 of the arcuate panels 52. The radially extending member 148 are illustrated herein as bosses 150 used for providing cooling air to an interior 162 of the radially outer casing 66 serves as the radially extending members 148. The axial leaf springs 144 include free ends 164 of the leaf spring members 146 and are designed to engage and snap into grooves or detentes 170 in the boss 150. The axial leaf springs 144 are configured to supply a pre-load axial force between the boss 150 and the panel bases 58 of the arcuate panels 52, thus, providing spring loaded circumferential positioning of the arcuate panels 52. Each boss 150 is engaged by a pair of the axial leaf springs 144 on an adjacent pair of the arcuate panels 52 respectively as illustrated in FIG. 11.

Referring to FIGS. 4A, 4B, 9, and 11, the exemplary embodiment of the spring mounted air distribution manifold 51 illustrated herein provides axial positioning means 128 for positioning the panels 52 and the hoop 120 axially so that the spray holes 100 are aimed or oriented to impinge the thermal control air 36 (cooling air) into the centers 106 of the fillets 104 of the forward and aft thermal control rings 84, 86. The axial positioning means 128 is exemplified herein as a circular row of spring clamps or clips 180 mounted to the radially inwardly facing surfaces 182 of the panel bases 58 of the arcuate panels 52. The spring clamps or clips 180 are designed to be clipped or clamped to the casing 66 or to a feature attached to or part of the casing 66.

The spring clips 180, of which two per panel 52 are illustrated herein, may be double riveted to the panel bases 58 for anti-rotation purposes. The spring clips 180 are illustrated herein as being clipped to at least one of the pseudo-flanges or thermal control rings of the radially outer casing 66 of the high pressure turbine 22. The spring clips 180 include a spring base 184 mounted or attached to the panel bases 58. Longitudinally or axially spaced apart spring fingers 186 depend inwardly from the spring base 184 and engage and clip one of the forward and aft thermal control rings 84, 86 illustrated herein as the aft thermal control ring 86. The aft thermal control ring 86 may have a chamfer 188 at a radially outer end 187 of the aft thermal control ring 86 to facilitate the attachment of the spring clips 180 to the aft thermal control ring 86. The spring clips 180 allow the arcuate panels 52 to slide circumferentially to facilitate assembly of the distribution manifold 51 and its attachment to the outer casing 66 of the high pressure turbine 22.

The present invention has been described in connection with various embodiments, examples and combinations. However, it will be understood by those skilled in the arts involved that this invention is capable of a variety of modifications, variations and amplification without departing from its scope as defined in the appended claims.

While there have been described herein, what are considered to be preferred and exemplary embodiments of the present invention, other modifications of the invention shall be apparent to those skilled in the art from the teachings herein.

The invention claimed is:

1. An arcuate panel of a spring mounted air distribution manifold, the arcuate panel comprising:
   an arcuate panel base;
   at least one panel header extending axially from and sealingly attached to a radially outwardly facing surface of the arcuate panel base;
   a number of plenums, wherein at least one plenum is located between the panel header and the arcuate panel base;
   one or more spray tubes or channels depending radially inwardly from and mounted on or attached to a radially inwardly facing surface of the arcuate panel base, wherein the spray tubes or channels are in fluid communication with the plenums;
   radially outwardly biasing springs mounted on or attached to the radially inwardly facing surface of the arcuate panel base; and
   at least one set of clockwise and counter-clockwise hinge wings attached to clockwise and counter-clockwise ends respectively of the arcuate panel base.

2. The arcuate panel of claim 1, wherein the radially outwardly biasing springs comprise radially bent leaf springs.

3. The arcuate panel of claim 1, further comprising an axial positioner configured to position the arcuate panel axially and aim a number of spray holes of the spray tubes or channels, and a circumferential positioner configured to position the arcuate panel circumferentially.

4. The arcuate panel of claim 3, wherein the axial positioner comprises a circular row of spring clamps or clips mounted on or attached to the radially inwardly facing surface of the arcuate panel base.

5. The arcuate panel of claim 4, wherein each of the spring clamps or clips comprise longitudinally or axially spaced apart spring fingers depending radially inwardly from a spring base attached to the radially inwardly facing surface of the arcuate panel base.

6. The arcuate panel of claim 5, wherein the radially outwardly biasing springs comprise radially bent leaf springs.

7. The arcuate panel of claim 3, further comprising:
   circularly elongated feed apertures or slots disposed through the arcuate panel base within the panel headers,
   wherein the elongated feed apertures or slots are configured to flow control air from the plenums to the spray tubes or channels,
   and wherein the spray tubes or channels are comprised of arcuate segments attached to the arcuate panel base, and are closed and sealed at their circumferential ends; and
   circularly elongated exhaust apertures or slots disposed through the arcuate panel base outside of the panel headers.

8. The arcuate panel of claim 7, wherein the axial positioner comprises a circular row of spring clamps or clips mounted on or attached to the radially inwardly facing surface of the arcuate panel base.

9. The arcuate panel of claim 8, wherein each of the spring clamps or clips comprises longitudinally or axially spaced apart spring fingers depending radially inwardly from a spring base attached to the radially inwardly facing surface of the arcuate panel base.

10. A thermal control assembly comprising:
    a spring mounted thermal air distribution manifold encircling a portion of an outer casing, wherein the manifold comprises an annular row or hoop of arcuate panels, and wherein each of the arcuate panels comprises an arcuate panel base and at least one panel header extending axially from and sealingly attached to a radially outwardly facing surface of the arcuate panel base;
    a number of plenums, wherein at least one plenum is located between the panel header and the arcuate panel base;
    one or more spray tubes or channels depending radially inwardly from and mounted on or attached to a radially inwardly facing surface of the arcuate panel base, wherein the spray tubes or channels are in fluid communication with the plenums;
    radially outwardly biasing springs mounted on or attached to the radially inwardly facing surface of the arcuate panel base and contacting the outer casing; and
    connecting hinges pivotably attaching adjacent ones of the arcuate panels in the hoop, wherein each of the connecting hinges comprises clockwise and counter-clockwise hinge wings pivotably connected together, and wherein the clockwise and counter-clockwise hinge wings are attached to clockwise and counter-clockwise ends respectively of adjacent ones of the arcuate panel bases.

11. The thermal control assembly of claim 10, wherein the radially outwardly biasing springs comprise radially bent leaf springs.

12. The thermal control assembly of claim 11, further comprising:
    the one or more thermal control rings comprising forward and aft thermal control rings,
    the radially bent leaf springs comprising axially spaced apart circular forward and aft rows attached to the radially inwardly facing surfaces of each of the panel bases, and
    the forward and aft rows of the radially bent leaf springs engaged and compressed against radially outer ring surfaces of the forward and aft thermal control rings.

13. The thermal control assembly of claim 12, further comprising:
    one or more connecting hinges pivotably attaching all but a last pair of adjacent ones of the arcuate panels in the hoop,
    one or more locking hinges pivotably attaching the last pair of adjacent ones of the arcuate panels, and
    a removable hinge pin disposed through hollow clockwise and counter-clockwise hollow knuckles of adjacent clockwise and counter-clockwise hinge wings respectively of the one or more locking hinges.

14. The thermal control assembly of claim 13, further comprising:

each of the connecting hinges comprising a hinge pin disposed through clockwise and counter-clockwise knuckles of the clockwise and counter-clockwise hinge wings respectively, the hinge pin integral with the central clockwise knuckle and rotatably disposed through the counter-clockwise knuckle, and the central clockwise knuckle comprising J hooks looped around the hinge pin.

15. The thermal control assembly of claim 14, further comprising:

the outer casing comprising axially spaced apart forward and aft casing flanges, the radially bent leaf springs comprising a third row of the radially bent leaf springs attached to the radially inwardly facing surfaces of each of the panel bases, the third row of the radially bent leaf springs engaged and compressed against a third radially outer ring surface of the aft casing flange, and the third row axially spaced apart from the forward and aft rows of the radially bent leaf.

16. The thermal control assembly of claim 10, further comprising:

one or more thermal control rings attached to or integral with the outer casing and one or more of the spray tubes or channels axially spaced apart from and partially radially coextensive with the one or more thermal control rings; and an axial positioner configured to position the arcuate panel axially and aim a number of spray holes of the spray tubes or channels, and a circumferential positioner configured to position the arcuate panel circumferentially.

17. The thermal control assembly of claim 16, wherein the axial positioner comprises a circular row of spring clamps or clips mounted or attached to the radially inwardly facing surface of the arcuate panel base and clamped or clipped on a single one of the one or more thermal control rings.

18. The thermal control assembly of claim 17, further comprising:

each of the spring clamps or clips comprising longitudinally or axially spaced apart spring fingers depending radially inwardly from a spring base attached to the radially inwardly facing surface of the arcuate panel base, wherein the axially spaced apart spring fingers engage the single one of the one or more thermal control rings; and a chamfer at a radially outer end of the single one of the one or more thermal control rings.

19. The thermal control assembly of claim 17, further comprising:

radially extending members of the radially outer casing circumferentially located between each pair of adjacent ones of the arcuate panels, the circumferential positioner comprising a pair of axial leaf springs on an adjacent pair of the arcuate panels respectively extending generally circumferentially and engaging one of the radially extending members, and the axial leaf springs comprising free ends engaging and snapped into grooves or detentes in the radially extending members.

* * * * *